United States Patent
Hellwig et al.

(10) Patent No.: US 9,324,353 B2
(45) Date of Patent: Apr. 26, 2016

(54) DUAL SEGREGANT HEAT ASSISTED MAGNETIC RECORDING (HAMR) MEDIA

(71) Applicant: HGST Netherlands B.V., Amsterdam (NL)

(72) Inventors: Olav Hellwig, San Jose, CA (US); Oleksandr Mosendz, San Jose, CA (US); Simone Pisana, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 130 days.

(21) Appl. No.: 14/084,535

(22) Filed: Nov. 19, 2013

(65) Prior Publication Data
US 2015/0138939 A1    May 21, 2015

(51) Int. Cl.
| G11B 5/66 | (2006.01) |
| G11B 5/65 | (2006.01) |
| G11B 5/00 | (2006.01) |

(52) U.S. Cl.
CPC .. *G11B 5/66* (2013.01); *G11B 5/65* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,981,017 A | 11/1999 | Agarwal et al. | |
| 7,235,750 B1 | 6/2007 | Coutu, Jr. et al. | |
| 7,678,476 B2 | 3/2010 | Weller et al. | |
| 7,838,135 B2 | 11/2010 | Kuo et al. | |
| 7,862,914 B2 | 1/2011 | Kubota et al. | |
| 7,869,162 B2 | 1/2011 | Lu et al. | |
| 8,114,470 B2 | 2/2012 | Gao et al. | |
| 8,173,282 B1* | 5/2012 | Sun et al. | 428/831 |
| 8,268,462 B2* | 9/2012 | Peng et al. | 428/836.2 |
| 8,345,374 B2 | 1/2013 | Sendur et al. | |
| 8,399,051 B1 | 3/2013 | Hellwig et al. | |
| 8,460,805 B1 | 6/2013 | Gao et al. | |
| 8,507,114 B2 | 8/2013 | Peng et al. | |
| 8,509,039 B1 | 8/2013 | Huang et al. | |
| 8,530,065 B1* | 9/2013 | Chernyshov et al. | 428/829 |
| 8,623,670 B1 | 1/2014 | Mosendz et al. | |
| 8,889,275 B1* | 11/2014 | Yuan et al. | 428/829 |

(Continued)

FOREIGN PATENT DOCUMENTS

| EP | 1887568 | 2/2008 |
| EP | 1887568 A1 | 2/2008 |

(Continued)

OTHER PUBLICATIONS

Mosendz, O. et al., "Ultra-high coercivity small-grain FePt media for thermally assisted recording," Journal of Applied Physics 111, 07B729, 2012, pp. 07B729-1-07B729-4.

(Continued)

*Primary Examiner* — Kevin Bernatz
(74) *Attorney, Agent, or Firm* — Zilka-Kotab, PC (57) ABSTRACT

In one embodiment, a magnetic media suitable for HAMR recording includes a recording layer having first and second magnetic layers. The first magnetic layer has a first segregant between magnetic grains thereof, the first segregant being primarily C. Moreover, the second magnetic layer is formed above the first magnetic layer. The second magnetic layer has a second segregant between magnetic grains thereof, the second segregant being primarily C and a second component. Additional systems and methods are also described herein.

23 Claims, 8 Drawing Sheets

(56) References Cited

U.S. PATENT DOCUMENTS

| | | | |
|---|---|---|---|
| 2004/0081031 | A1 | 4/2004 | Saga et al. |
| 2005/0202287 | A1 | 9/2005 | Lu et al. |
| 2006/0269794 | A1 | 11/2006 | Oikawa |
| 2007/0253116 | A1 | 11/2007 | Takahashi |
| 2008/0026255 | A1 | 1/2008 | Das et al. |
| 2008/0090106 | A1 | 4/2008 | Braunstein et al. |
| 2010/0149676 | A1 | 6/2010 | Khizorev et al. |
| 2010/0182714 | A1 | 7/2010 | Kanbe et al. |
| 2010/0284104 | A1 | 11/2010 | Dieny et al. |
| 2010/0315735 | A1 | 12/2010 | Zhou et al. |
| 2011/0096431 | A1 | 4/2011 | Hellwig et al. |
| 2011/0116189 | A1 | 5/2011 | Sasaki |
| 2011/0193097 | A1 | 8/2011 | Autry |
| 2011/0235479 | A1 | 9/2011 | Kanbe et al. |
| 2012/0052330 | A1* | 3/2012 | Takekuma et al. ............ 428/829 |
| 2012/0123525 | A1 | 5/2012 | Kramer-Brown et al. |
| 2012/0225323 | A1 | 9/2012 | Nakai et al. |
| 2012/0225325 | A1* | 9/2012 | Nemoto et al. ............... 428/829 |
| 2012/0237791 | A1 | 9/2012 | Lin |
| 2012/0251842 | A1 | 10/2012 | Yuan et al. |
| 2012/0251845 | A1 | 10/2012 | Wang et al. |
| 2012/0300600 | A1 | 11/2012 | Kanbe et al. |
| 2013/0004796 | A1 | 1/2013 | Peng et al. |
| 2013/0071695 | A1* | 3/2013 | Peng et al. .................... 428/831 |
| 2013/0201805 | A1 | 8/2013 | Seigler et al. |
| 2013/0270505 | A1 | 10/2013 | Dahmani |
| 2014/0153128 | A1* | 6/2014 | Teguri et al. .................... 360/59 |
| 2014/0233363 | A1* | 8/2014 | Kryder et al. ............. 369/13.37 |
| 2015/0179204 | A1 | 6/2015 | Mosendz et al. |

FOREIGN PATENT DOCUMENTS

| | | |
|---|---|---|
| JP | 2000332318 A | 11/2000 |
| JP | 2008034078 A | 2/2008 |
| JP | 2008091024 A | 4/2008 |
| JP | 2009064501 A | 3/2009 |
| JP | 2010182386 A | 8/2010 |
| JP | 2012048784 A | 3/2012 |
| JP | 2012104212 A | 5/2012 |
| WO | 2013044133 | 3/2013 |
| WO | 2013044133 A1 | 3/2013 |

OTHER PUBLICATIONS

Weller, D. et al., "L10 FePtX-Y media for heat-assisted magnetic recording," Phys. Status Solidi A, 210, No. 7, Wiley-VCH Verlag GmbH & Co., 2013, pp. 1245-1260.

Varaprasad, B. et al., "L10 ordered FePt based perpendicular recording media for heat assisted magnetic recording heat assisted magnetic recording," IEEE Transactions on Magnetics, vol. 49, Issue 2, 2013, pp. 718-722.

Pisana, S. et al., "Effects of grain microstructure on magnetic properties in FePtAg-C media for temperature assisted recording," Journal of Applied Physics, 113, 043910, 2013, pp. 043910-1-043910-6.

Kryder, M.H. et al., "Heat Assisted Magnetic Recording," Proceedings of the IEEE, vol. 96, No. 11, Nov. 2008, pp. 1810-1835.

Mosendz et al., U.S. Appl. No. 14/140,408, filed Dec. 24, 2013.

Hirotsune et al., U.S. Appl. No. 14/522,554, filed Oct. 23, 2014.

Non-Final Office Action from U.S. Appl. No. 14/140,408, dated Apr. 23, 2015.

Weller et al., "A HAMR Media Technology Roadmap to an Areal Density of 4 Tb/in2," IEEE Transaction on Magnetics, vol. 50, No. 1, Jan. 2014, pp. 1-8.

Challener et al., "Heat-assisted magnetic recording by a near-field transducer with efficient optical energy transfer," Nature Photonics, vol. 3, Apr. 2009, pp. 220-224.

Schuller et al., "Plasmonics for extreme light concentration and manipulation," Nature Materials, vol. 9, Mar. 2010, pp. 193-204.

Pan et al., "Heat-assisted magnetic recording," Nature Photonics, vol. 3, Apr. 2009, pp. 189-190.

Lim et al., "Interfacial Effects of MgO Buffer Layer on Perpendicular Anisotropy of L 10 FePt Films," IEEE Transactions on Magnetics, vol. 42, No. 10, Oct. 2006, pp. 3017-3019.

Statement of Relevance of JP2008091024, 1 page, (document published 2008).

U.S. Appl. No. 14/505,440, filed Oct. 2, 2014.

Granz et al., "Granular L10 FePt:X (X = Ag, B, C, SiOx, TaOx) thin films for heat assisted magnetic recording," The European Physical Journal B, vol. 86, No. 81, 2013, pp. 1-7.

Final Office Action from U.S. Appl. No. 14/140,408, dated Sep. 3, 2015.

Advisory Action from U.S. Appl. No. 14/140,408, dated Dec. 7, 2015.

Office Action from Japanese Application No. 2014-258951, dated Dec. 18, 2015.

Statement of Relevance of Non-Translated Foreign Document for JP2010182386.

Non-Final Office Action from U.S. Appl. No. 14/140,408, dated Feb. 2, 2016.

Non-Final Office Action from U.S. Appl. No. 14/522,554, dated Mar. 10, 2016.

* cited by examiner

DUAL SEGREGANT HEAT ASSISTED MAGNETIC RECORDING (HAMR) MEDIA

FIELD OF THE INVENTION

The present invention relates to data storage systems, and more particularly, this invention relates to magnetic grains of magnetic media having at least two different layered segregant materials.

BACKGROUND

The heart of a computer is a magnetic hard disk drive (HDD) which typically includes a rotating magnetic disk, a slider with read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

However, the further miniaturization of the various components, particularly, the size and/or pitch of magnetic grains, presents its own set of challenges and obstacles in conventional products. Noise performance and spatial resolution are key parameters in magnetic recording media and are ongoing challenges to advance the achievable areal density of media. The dominant media noise source today is transition jitter. In sputtered media, it reflects the finite size, random positioning and dispersions in size, orientation and magnetic properties of the fine grains that comprise the media.

In order to address grain size and transition jitter it was proposed to change the recording mechanism from conventional magnetic field recording to heat assisted magnetic recording (HAMR), also known as "thermally assisted magnetic recording" TAR or TAMR. HAMR recording employs heat to lower the effective coercivity of a localized region on the magnetic media surface and write data within this heated region. The data state becomes stored, or "fixed," upon cooling the media to ambient temperatures. HAMR techniques can be applied to longitudinal and/or perpendicular recording systems, although the highest density state of the art storage systems are more likely to be perpendicular recording systems. Heating of the media surface has been accomplished by a number of techniques such as focused laser beams or near field optical sources.

HAMR allows magnetic recording technology to use materials with substantially larger magnetic anisotropy (e.g., small thermally stable grains are possible) and coercive field by localized heating of the magnetic layer above its Curie temperature, where anisotropy is reduced. Currently the most promising media magnetic material for HAMR recording is chemically ordered FePt L10 alloy. Chemical ordering is achieved by deposition of FePt at elevated temperatures (450-700deg. C). However elevated deposition temperature of granular FePt films results in two main undesired effects: grain joining and grain roughening, which deteriorates microstructure of the films; and admixture of FePt with certain segregants, which deteriorates magnetic anisotropy and thus thermal stability of the grains. Therefore it is imperative to engineer segregant materials which allow for a columnar microstructure of FePt L10 with high magnetic anisotropy.

One example of a segregant for HAMR media which keeps FePt L10 grains isolated and yields high magnetic anisotropy is Carbon. However FePt—C granular media have generally spherical grains when formed, which undesirably limits the achievable thickness of the media for a given average grain diameter, thereby imposing a serious limitation on the signal strength of the media. These HAMR spherical grain FePt—C media are also rough, having a bimodal grain size distribution for larger grains (grain diameters from 6 nm to 8 nm) in addition to thermally unstable smaller grains (grain diameters less than 3 nm). Attempts to form more cylindrical or columnar grains for HAMR media suffer from their own shortcomings. Although some attempts have improved the grain shape from its spherical form, these attempts have consequently degraded the magnetic properties of the magnetic media dramatically. Even prior attempts at incorporating dual layers having oxide segregants have resulted in poor magnetic properties and are not useful for HAMR media. Such attempts compromise the magnetic properties of the media as a whole; in particular the coercivity is drastically diminished, thereby rendering the recording media effectively useless.

SUMMARY

In one embodiment, a magnetic media suitable for HAMR recording includes a recording layer having first and second magnetic layers. The first magnetic layer has a first segregant between magnetic grains thereof, the first segregant being primarily C. Moreover, the second magnetic layer is formed above the first magnetic layer. The second magnetic layer has a second segregant between magnetic grains thereof, the second segregant being primarily a mix of C and a second component.

In another embodiment, a magnetic medium includes a recording layer having first and second magnetic layers each having FePt. The first magnetic layer has a first segregant between magnetic grains thereof. Moreover, the second magnetic layer is formed above the first magnetic layer. The second magnetic layer has a second segregant between magnetic grains thereof, the second segregant being different than the first segregant.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof, including media having multi layered recording layers with different segregant materials. For example, various embodiments herein introduce recording layers including at least two magnetic layers, each having a materially different carbon based segregant. Material components may be introduced to the carbon based segregants thereby improving the grain shape in addition to the magnetic properties of the magnetic medium. Moreover, various embodiments described herein include single and/or dual layered granular magnetic media having C and BN+C, resulting in significant improvements over the conventional deficiencies, as will be described in detail below.

In one general embodiment, a magnetic media suitable for HAMR recording includes a recording layer having first and second magnetic layers. The first magnetic layer has a first segregant between magnetic grains thereof, the first segregant being primarily C. Moreover, the second magnetic layer is formed above the first magnetic layer. The second magnetic layer has a second segregant between magnetic grains thereof, the second segregant being primarily C and a second component.

In another general embodiment, a magnetic medium includes a recording layer having first and second magnetic layers each having FePt. The first magnetic layer has a first segregant between magnetic grains thereof. Moreover, the second magnetic layer is formed above the first magnetic layer. The second magnetic layer has a second segregant between magnetic grains thereof, the second segregant being different than the first segregant.

Figure 1:
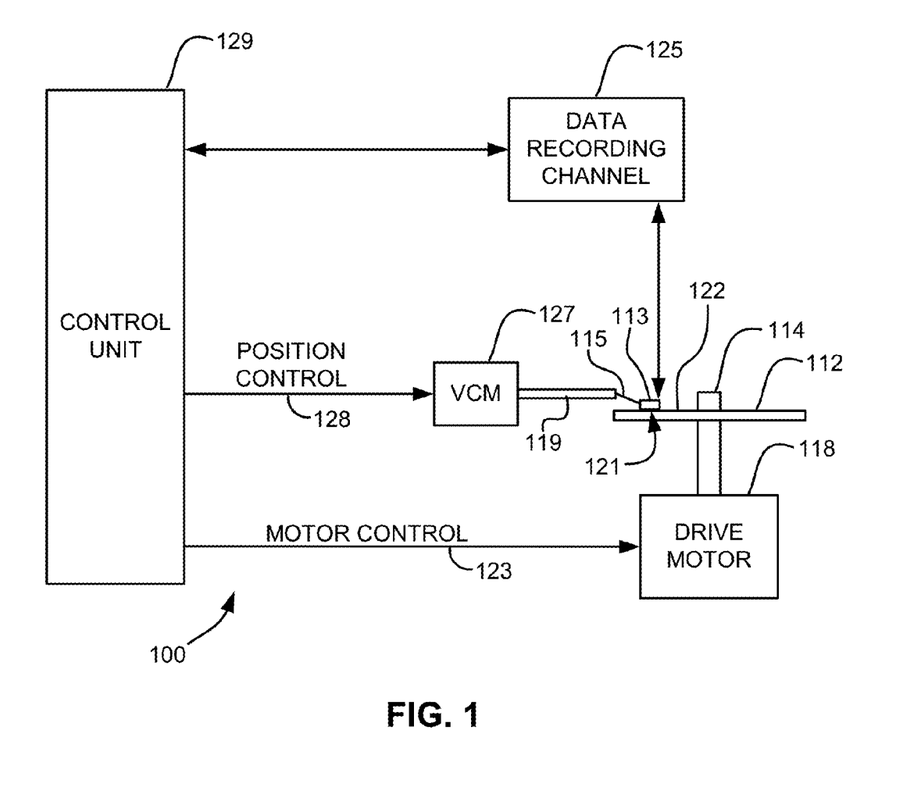
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
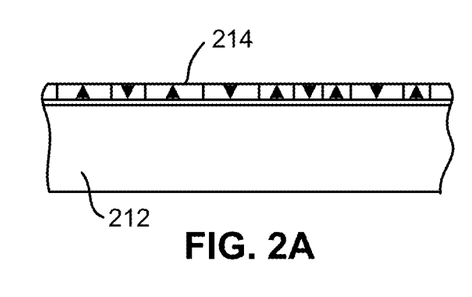
FIG. 2A is a magnetic recording medium utilizing a perpendicular HAMR recording format.

FIG. 2A illustrates, schematically, a HAMR recording medium usable with magnetic disc recording systems, such as that shown in FIG. 1. This medium is utilized for recording magnetic impulses substantially perpendicular to the surface of a recording medium. For such perpendicular recording the medium typically includes an under layer 212 of a material having a high magnetic permeability. This under layer 212 is then provided with an overlying coating 214 of HAMR-type magnetic material preferably having a high coercivity relative to the under layer 212.

Figure 2B:
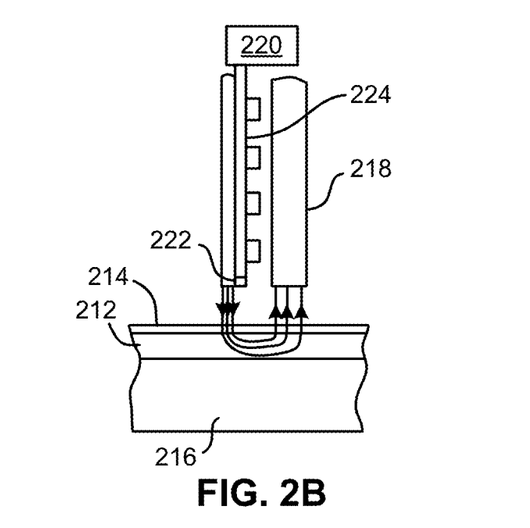
FIG. 2B is a schematic representation of a HAMR recording head and recording medium combination for perpendicular HAMR recording on one side.

FIG. 2B illustrates the operative relationship between a HAMR head 218 and a recording medium. The recording medium illustrated in FIG. 2B includes both the high permeability under layer 212 and the overlying coating 214 of magnetic material described with respect to FIG. 2A above. However, both of these layers 212 and 214 are shown applied to a suitable substrate 216. Typically there is also an additional layer (not shown) called an "exchange-break" layer or "interlayer" between layers 212 and 214.

A heating mechanism of any known type heats layer 214 to lower the effective coercivity of a localized region on the magnetic media surface in the vicinity of the write pole of the head 218. In the structure shown, a light source 220 such as a laser illuminates a near field transducer 222 of known type via a waveguide 224. See FIG. 4A for a description of an illustrative heating mechanism. Referring again to FIG. 2B, the magnetic lines of flux extending between the poles of the head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 3A:
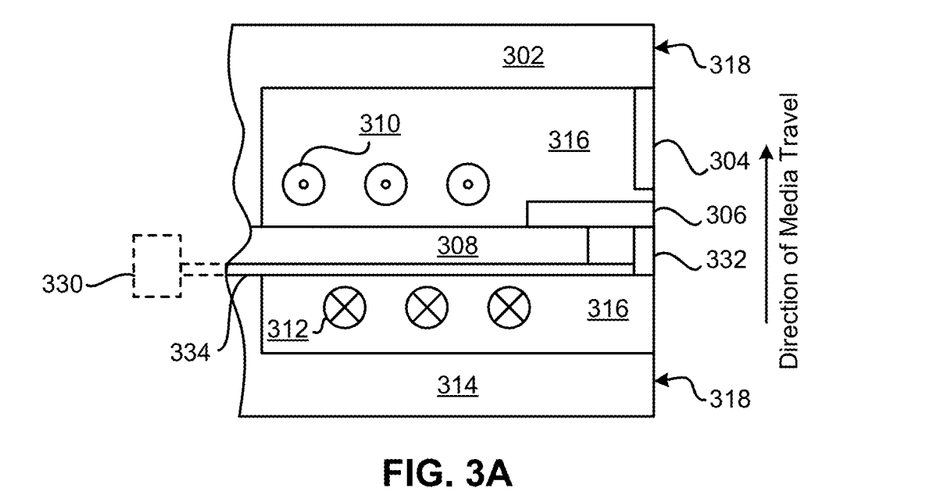
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

A heating mechanism of any known type is provided to heat the medium for HAMR. In the structure shown, a light source 330 such as a laser illuminates a near field transducer 332 of known type via a waveguide 334.

Perpendicular writing is achieved by forcing flux through the stitch pole 308 into the main pole 306 and then to the surface of the disk positioned towards the ABS 318.

Figure 3B:
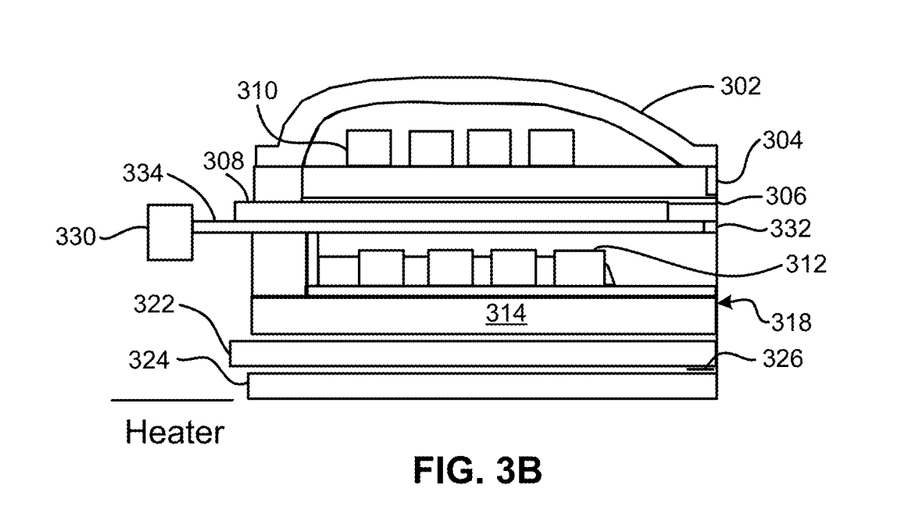
FIG. 3B is a cross-sectional view of one particular embodiment of a piggyback magnetic head with helical coils.

FIG. 3B illustrates a piggyback magnetic head having similar features to the head of FIG. 3A, including the heating mechanism. Two shields 304, 314 flank the stitch pole 308 and main pole 306. Also sensor shields 322, 324 are shown. The sensor 326 is typically positioned between the sensor shields 322, 324.

In FIG. 3B, an optional heater is shown near the non-ABS side of the magnetic head. A heater (Heater) may also be included in the magnetic heads shown in FIG. 3A. The position of this heater may vary based on design parameters such as where the protrusion is desired, coefficients of thermal expansion of the surrounding layers, etc.

Figure 4A:
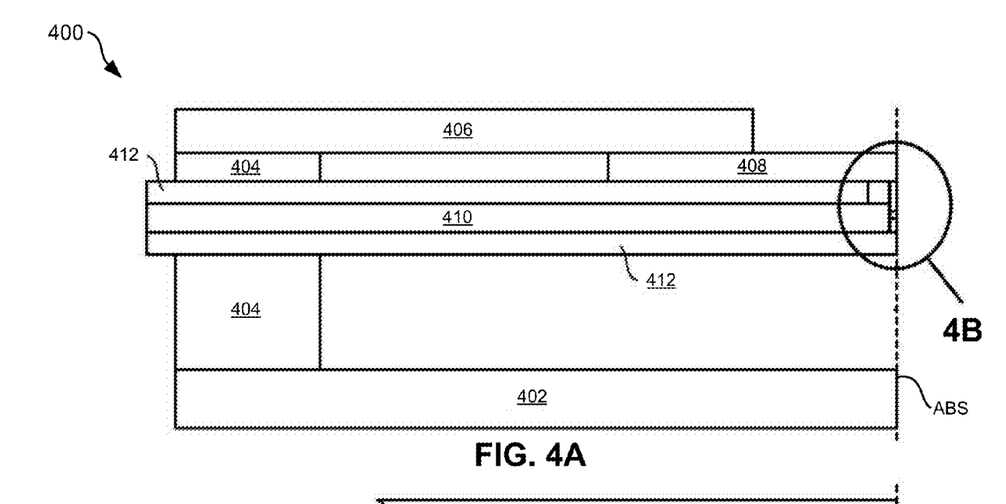
FIG. 4A is a partial cross section view of a thin film perpendicular write head design according to one embodiment.

Now referring to FIG. 4A, a partial cross section view of a system 400 having a thin film perpendicular write head design incorporating an integrated aperture near field optical source (e.g., for HAMR operation) is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 4A, the write head has a lower return pole layer 402, back-gap layer(s) 404, upper return pole layer 406, and upper pole tip layer 408. In one approach, the lower return pole layer 402 may also have a lower pole tip (not shown) at the ABS. Layer 410 is an optical waveguide core, which may be used while conducting HAMR, e.g., to heat a medium (not shown) at the ABS when the system 400 is writing thereto. According to a preferred approach, the optical waveguide core is surrounded by cladding layers 412. Moreover, layers 410 and 412 may extend through at least a portion of back-gap layer(s) 404. The components inside of Circle 4B are shown in an expanded view in FIG. 4B, as discussed in further detail below.

Layer 410 may be comprised of a suitable light transmitting material, as would be known by one of reasonable skill in the relevant art. Exemplary materials preferably include $Ta_2O_5$, and/or $TiO_2$. As shown, the core layer 410 has approximately uniform cross section along its length. As well known in the art, the optical waveguide can have a number of other possible designs including a planar solid immersion mirror or planar solid immersion lens which have a non-uniform core cross section along the waveguide's length.

In various approaches, coil layers (not shown) and various insulating and spacer layers (not shown) might reside in the cavity bounded by the ABS, back-gap(s) 404, lower return pole 402, and/or upper bounding layers 406, 408, and 412 as would be recognized by those of skill in the art. Layers 402, 404, 406, and 408 may be comprised of a suitable magnetic alloy or material, as would be known by one of reasonable skill in the relevant art. Exemplary materials include Co, Ni, and/or Fe and combinations thereof.

As described above, FIG. 4B is a partial cross section expanded view of detail 4B in FIG. 4A, in accordance with one embodiment. Pole lip 416 is magnetically coupled to upper pole tip layer 408, and to optional magnetic step layer 414. Aperture 418 (also known as a ridge aperture), surrounding metal layer 420, and pole lip 416 comprise the near field aperture optical source (or near field transducer), which is supplied optical energy via optical waveguide core 410. Pole lip 416 and optional magnetic step layer 414 may be comprised of a suitable magnetic alloy, such as Co, Fe, Ni, and/or combinations thereof. Metal layer 420 may be comprised of Cu, Au, Ag, and/or alloys thereof, etc.

Figure 4B:
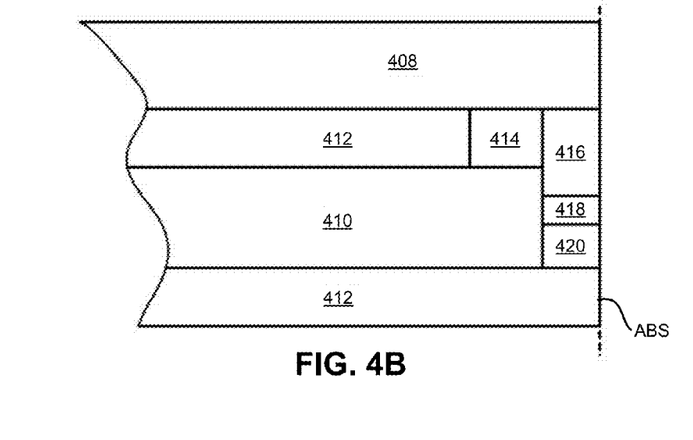
FIG. 4B is a partial cross section expanded view of detail 4B in FIG. 4A, in accordance with one embodiment.

With continued reference to FIG. 4B, cladding layer 412 thickness may be nominally about 200 nm, but may be thicker or thinner depending on the dimensions of other layers in the structure. Optional magnetic step layer 414 may have a nominal thickness (the dimension between layers 408 and 410) of about 150 nm, and a nominal depth (as measured from layer 416 to layer 412) of about 180 nm. Pole lip 416 may have a nominal depth (as measured from the ABS) approximately equal to that of layer 420, with the value being determined by the performance and properties of the near field optical source (see examples below). The thickness of the pole lip 416 can vary from about 150 nm (with the optional magnetic step layer 414) to about 1 micron, preferably between about 250 nm and about 350 nm. The thickness of optical waveguide core layer 410 may be nominally between about 200 nm and about 400 nm, sufficient to cover the thickness of the aperture 418.

As described above, thermal management is an important factor for HAMR heads, as high operating temperatures in HAMR heads can lead to serious damage thereto. Thus, various embodiments described and/or suggested herein preferably include an improved heat sink design which may reduce the head peak temperature of HAMR heads. As a result, according to various approaches, the NFT peak temperature can effectively be reduced, thereby improving head reliability significantly. Moreover, approaches described and/or suggested herein may also allow for a narrower main pole lip in addition to a wider step, thereby improving performance of the system.

Except as otherwise described herein, the various components of the structures of FIGS. 3A-4B may be of conventional materials and design, as would be understood by one skilled in the art.

As described above, conventional media have poor physical and magnetic properties. However, in sharp contrast, various embodiments described herein include magnetic media having multi layered recording layers with different segregant structures.

As will be discussed in detail below, the inventors discovered that by implementing magnetic layers and/or segregants having different material compositions in multi layered recording layers, the advantages of each of the materials are able to contribute towards improving the overall performance of the recording layer. As a result, different embodiments herein are able to maintain high coercivity values (e.g., above about 4 Tesla), more than double the achievable media thickness over the previous conventional limits, generate smoother media surfaces, and desirably form more columnar shaped magnetic grains therein.

For example, looking to FIGS. 5A-5B, magnetic media are illustrated as having multiple magnetic layers, each having a different segregant which will be described in further detail below.

Figure 5A:
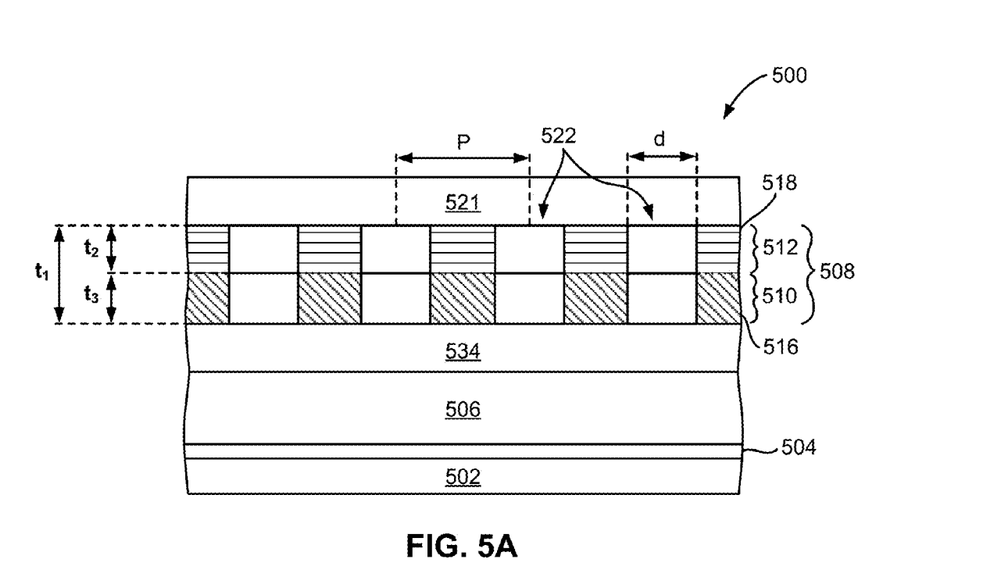
FIG. 5A is a partial cross-sectional view of a magnetic medium according to one embodiment.
Figure 5B:
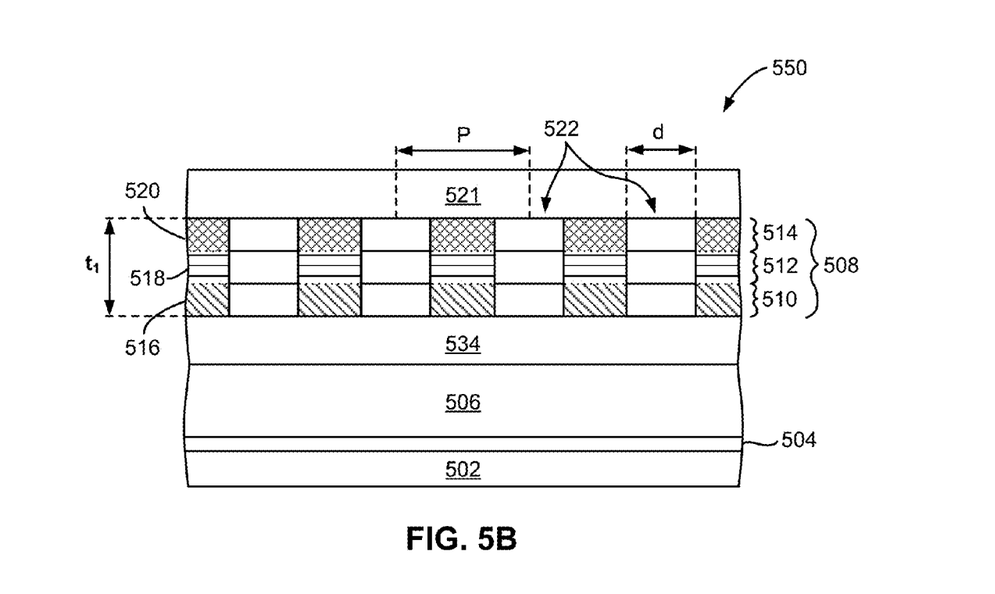
FIG. 5B is a partial cross-sectional view of a magnetic medium according to one embodiment.

FIGS. 5A-5B depict a portion of magnetic media 500, 550, in accordance with different embodiments. As an option, the present magnetic media 500, 550 may be implemented in conjunction with features from any other embodiment listed herein, such as those described with reference to the other FIGS. Of course, however, such magnetic media 500, 550 and others presented herein may be used in various applications and/or in permutations which may or may not be specifically described in the illustrative embodiments listed herein. Further, the magnetic media 500, 550 presented herein may be used in any desired environment.

Referring to the embodiment shown in FIG. 5A, the magnetic medium 500 includes a seed layer 504, e.g., NiTa and/or other suitable seed material, above substrate layer 502 which may include modern high temperature glass or other substrates, which allow media deposition at elevated temperatures, e.g., on the order of 600-700° C. Above seed layer 504 there may be one or more soft under layers and/or heat-sink layer 506, in addition to a seed layer 534 which may act as a texture defining layer, e.g., influencing the epitaxial growth of the magnetic layers 510, 512 formed there above. Note that additional layers may be present. Moreover, unless otherwise specified, the various layers in this and other embodiments may be formed using conventional processes.

With continued reference to FIG. 5A, the magnetic medium 500 further includes a recording layer 508 having a plurality of composite magnetic grains 522. The composite magnetic grains 522 are formed by the individual magnetic grains of the magnetic layers 510, 512, and are preferably characterized by a desirable columnar shape. Thus, the composite magnetic grains 522 preferably extend through each of the magnetic layers 510, 512 of the recording layer 508.

With continued reference to FIG. 5A, all of the grains of the granular magnetic layers 510, 512 of the recording layer 508 are preferably separated by a segregant. As illustrated, the first magnetic layer 510 has a first segregant 516 between magnetic grains thereof, while the second magnetic layer 512 has a second segregant 518 between magnetic grains thereof.

The magnetic layers 510, 512 may be formed using a sputtering process. According to one approach, the magnetic grain material(s) and one or more segregant component(s) may be sputtered from the same target; however, in another approach, the magnetic grain material(s) and/or segregant component(s) may be sputtered from respective targets. The magnetic grain and segregant materials are preferably deposited onto the magnetic medium 500 at the same time, in a heated environment, e.g., from about 400 degrees to about 700 degrees Centigrade in the case of granular $L1_0$ chemically ordered FePt media. Magnetic material and segregant do not form a solid solution even at high temperature; thus a FePt-segregant system self organizes itself in a way which separates the magnetic grain material and segregant, forming the magnetic grains and isolating them from one another via the segregant forming along the grain boundaries. Thus, lateral direction magnetic film presents itself as alternating FePt/segregant/FePt/segregant, etc., while in the vertical direction FePt is not interrupted across the whole thickness of the magnetic film. As a result, the thermal conductivity in the lateral direction is reduced due to the presence of multiple FePt/segregant interfaces and typically is 5-20 times smaller than in the vertical direction.

Depending on the desired embodiment, the total thickness $t_1$ of the composite magnetic grains 522 may be from about 5 nm to about 20 nm, more preferably at least about 6 nm, but could be higher or lower depending on the desired embodiment. Depending on the approach, each of the two magnetic layers 510, 512 of the composite magnetic grains 522 may have a respective thickness $t_2$, $t_3$ from about 1 nm to about 10 nm, more preferably from about 1 nm to about 7 nm, but could be higher or lower, e.g., depending on how many magnetic layers are in the composite magnetic grains 522. It should be noted that, as used herein, the term "about" with reference to some stated value refers to the stated value ±10% of said value. Moreover, thicknesses $t_2$ and $t_3$ may be the same or different in various embodiments.

An average center to center pitch P of the magnetic grains in the recording layer 508 may be less than about 11 nm and greater than 2 nm, more preferably less than about 11 nm and greater than about 3 nm, but could be higher. Furthermore, an average diameter d of the magnetic grains is preferably from about 2 nm to about 10 nm, but could be higher or lower depending on the desired embodiment.

Regardless of the dimensions according to the given embodiment, the composite magnetic grains 522 preferably have an average aspect ratio (i.e., total thickness $t_1$ to diameter d) of about 1.2, but could be higher or lower depending on the desired embodiment.

Figure 7A:
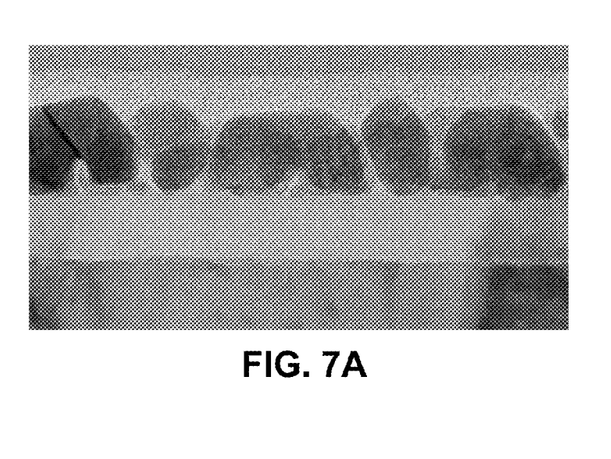
FIGS. 7A-7D are partial cross-sectional views of magnetic media according to several embodiments.
Figure 7B:
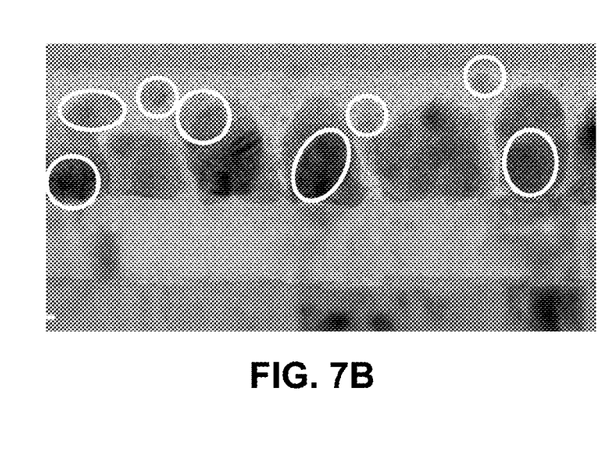

Although not illustrated in the present embodiment, the recording layer 508 may include additional magnetic grains that are not part of the composite magnetic grains 522, e.g., see FIG. 7B. However, with continued reference to the magnetic medium 500 of FIG. 5A, preferably, at least 90 vol % of the magnetic grains are composite magnetic grains 522 according to the various approaches described and/or suggested herein.

As mentioned above, the recording layer 508 includes a first magnetic layer 510, and a second magnetic layer 512 formed above the first magnetic layer 510. Although not illustrated in the embodiment of FIG. 5A, additional magnetic layers, e.g., a third magnetic layer (e.g., see 514 of FIG. 5B), fourth magnetic layer, fifth magnetic layer, etc., may be formed in the recording layer 508. It follows that any such additional magnetic layers may include any of the approaches described and/or suggested herein, depending on the desired embodiment.

Regardless of how many magnetic layers are included in an embodiment, preferably all of the magnetic layers below a cap layer 521 have a similar center to center pitch P. This similar center to center pitch may be due to the conformal growth on the lowermost magnetic layer that is transferred to the magnetic layers formed there above.

To facilitate a conformal growth of the magnetic layers, an etching step is preferably (but not necessarily) performed on each of the respective magnetic layers after they are formed. Thus, an etching step may be used to define the upper surface of each of the magnetic layers and expose the material of the magnetic layer, e.g., before an additional layer is formed there above. According to various approaches, the etching step may include an Inductively Coupled Plasma (ICP) etch step, etc. or any other etching processes that would be apparent to one skilled in the art upon reading the present description.

As a result, the magnetic grains of the second magnetic layer 512 may be physically characterized by growth directly on the magnetic grains of the first magnetic layer 510, primarily due to the etching step noted above. Similarly, the magnetic grains of any additional magnetic layers may be physically characterized by growth directly on the magnetic grains of the magnetic layer directly there below, triggering more columnar grain growth. Thus, the magnetic grains of the first and second magnetic layers 510, 512 together form a larger magnetic grain 522 that extends along the total thickness $t_1$ of the magnetic layer 508, e.g., which may form the thickness of the recording layer 508.

According to one approach, each of the first and second magnetic layers 510, 512 preferably include FePt. Moreover, illustrative material variants for the magnetic grains of at least one of the first and second magnetic layers 510, 512 may include FePt—X, where X may include one or more of Ag, Cu, Au, Ni, Mn, etc. In other embodiments, the first and/or second magnetic layers 510, 512 may include FePtX—Y, where X may include one or more of Ag, Cu, Au, Ni, Mn, etc., and Y may include one or more of C, $SiO_2$, $TiO_2$, etc. According to an exemplary embodiment, the first magnetic layer 510 may include about 20 vol % to about 50 vol % of C. However, the first segregant 516 in the first magnetic layer 510 is preferably almost entirely carbon, for reasons that soon will become apparent. For example, the carbon content of the first segregant 516 in the first magnetic layer 510 is greater than about 95 vol %.

As mentioned above, the segregants preferably contribute to the improved, columnar structure of the magnetic grains 522, in addition to the magnetic properties of the magnetic medium 500 as a whole. According to various approaches, the segregants 516, 518 may include similar materials, but preferably do not have the same composition. However, without wishing to limit the invention, in some approaches, the segregants 516, 518 may include the same materials.

In a preferred approach, the first segregant 516 may be primarily C, e.g., the first segregant 516 may include greater than about 95 vol % C. Furthermore, the second segregant 518 may be primarily C and a second component. In other words, a C content in the second segregant 518 may be in a range of about 50 vol % to about 80 vol %, but could be higher or lower, depending on the desired embodiment. Thus, the content of the second component in the second segregant 518 may be in a range of about 20 vol % to about 50 vol %, but could be higher or lower. Illustrative materials for the second component of the second segregant 518 include, but are not limited to, one or more of $SiO_2$, $TiO_2$, $TaO_x$, SiC, SiN, TiC, TiN, BN, BC, $Cr_2O_3$, CrN, etc.

As mentioned above, in some embodiments, a recording layer may include more than two magnetic layers. Looking now to FIG. 5B, the magnetic medium 550 includes an optional third magnetic layer 514. Moreover, the recording layer 508 also includes a third segregant 520 between magnetic grains 522 thereof.

The third segregant 520 may include any of the materials listed above for the second component. However, in a preferred approach the third segregant 520 may have a different composition than the second segregant 518, e.g., the third segregant 520 and the second segregant 518 may include different materials. Thus, depending on the embodiment, the third magnetic layer 514, and/or any additional magnetic layer, may have C or no C therein. A preferred design of the layered segregant structure has less and less carbon content in the segregant from bottom to top media layers. For example, in one illustrative approach having three layers, the bottom layer may have 80-100 vol % carbon in the segregant, the middle layer has 50-80 vol % carbon in the segregant, and the top layer has 0-50 vol % carbon in the segregant.

By incorporating more than one segregant to form a magnetic grain, various embodiments described herein are able to greatly improve the magnetic and physical properties of a given magnetic recording medium. Looking to FIGS. 7A-8D, the grain growth resulting from the inventors' exemplary experimentation is presented.

Figure 8A:
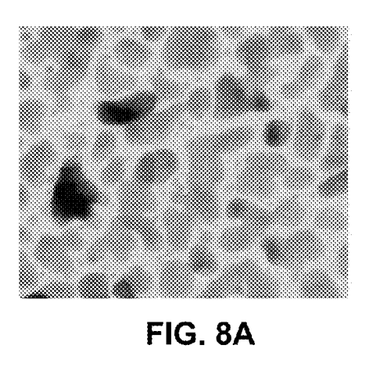
FIGS. 8A-8D are partial top-down views of magnetic media according to several embodiments.

FIGS. 7A and 8A correspond to a dual layered recording layer, each of the layers incorporating a BN–C segregant. Although the partial side view illustrated in FIG. 7A depicts the grains having desirable flat interfaces at the tops and bottoms of the grains, there is also joining between magnetic grains. Joining between grains undesirably results in grains having large diameters, thereby reducing the recording density of the recording layer and causing poor magnetic properties. This joining is also apparent in the top down view of FIG. 8A.

Figure 8B:
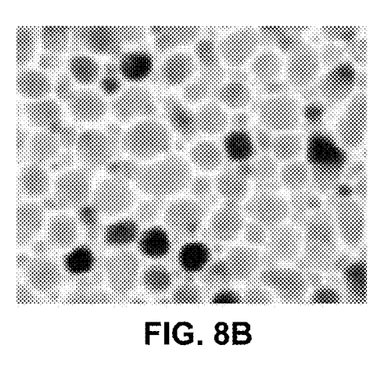

Alternatively, FIGS. 7B and 8B illustrate a dual layered recording layer, each of the layers having a C segregant. As opposed to the joined grains resulting from the BN–C segregant above, in the present samples the C segregant was found to cause the grains to become rounded, limiting the achievable thickness of the recording layer as a whole. Moreover, additional smaller grains are formed, interspersed among the main grain structures, as noted by the white circles in FIG. 7B. The magnetic orientations of these smaller grains are flipped frequently and are oriented randomly, which significantly increases the noise when attempting to read the data stored on the main grain structures. Although the grains in the present embodiment had poor structural composition, the isolation of each of the grains by the segregant was desirable.

Figure 7C:
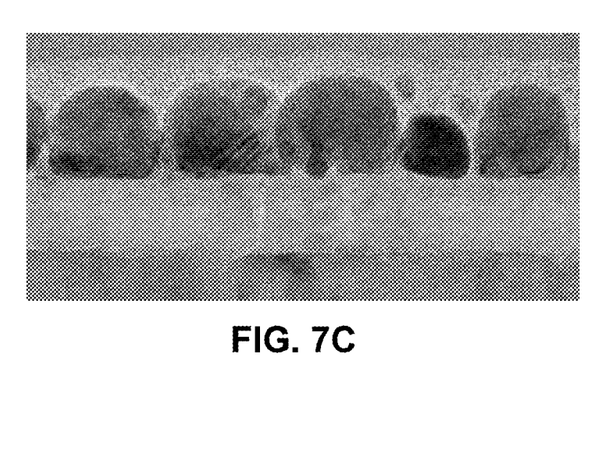
Figure 8C:
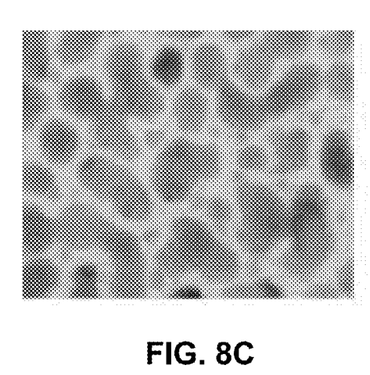

FIGS. 7C and 8C illustrate an attempt to incorporate both BN–C and C in the dual layered recording layer to combine the different desirable results seen in FIGS. 7A-7B and 8A-8B. Thus, the first (bottom) of the dual layers implemented a BN–C segregant, while the second (top) of the dual layers implemented a C segregant. However, the cross-sectional view in FIG. 7C still shows the grains as having undesirable rounded edges while the top down view of FIG. 8C shows poor isolation of each of the grains.

Figure 7D:
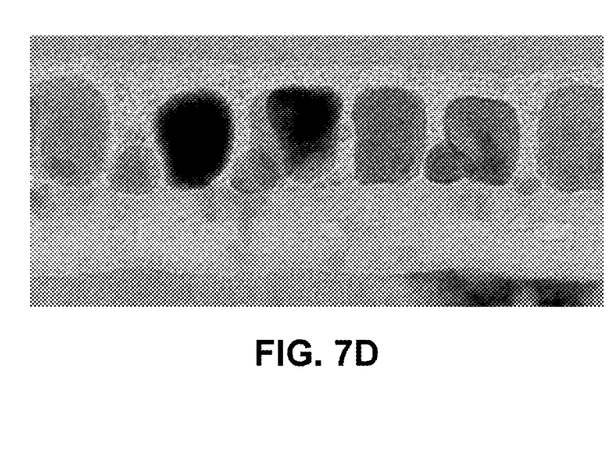
Figure 8D:
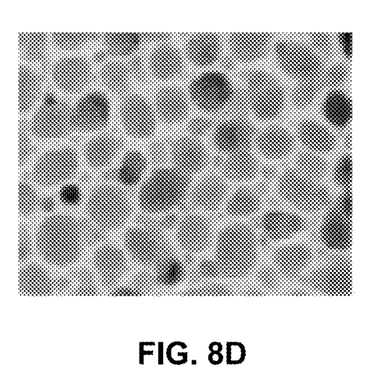

Moving to FIGS. 7D and 8D, the inventors implemented C as the segregant for the first layer of the dual layered recording layer, and BN–C for the second segregant in the second layer. As a result, not only were the side profiles of the resulting magnetic grains improved, the isolation of the grains as seen in the top down view was also enhanced. In addition to having desirable physical properties, the inventors also found that the recording layer had desirable magnetic properties.

Surprisingly, the inventors were able to influence sound magnetic properties and isolation of the grains in the first layer of the dual layered recording layer, and encourage improved structural characteristics of the grains in the second magnetic layer. Essentially, by combining two unique segregants in different layers of the recording layer, the inventors were able to translate each of the segregants' desirable properties to the magnetic grains. Thus, by layering, the recording layer may take advantage of the properties of one segregant with respect to one aspect of the grain, while adopting properties of another segregant for other aspects.

It should be noted that the results achieved were accomplished by trial and error, and could not have been predicted without conducting the experimentation resulting in structures such as those shown in FIGS. 7A-8D. Moreover, there was no way for the inventors to predict the results that were observed in each of the different structures. It should be noted that, although in the present example C and BN–C were used to achieve these desirable results, it is believed that the other materials listed herein will provide similar results when used in conjunction with a primarily C-based first segregant layer. Without wishing to be bound by any theory, it is presently believed that the primarily C-based first segregant layer promotes good grain separation, while use of a BN–C or the like-based second segregant layer promotes a more columnar shape of the grains, thereby resulting in various beneficial and novel grain structures described herein.

Thus, for example, looking particularly to FIGS. 7D and 8D, the inventors were able to construct grains having smaller diameters, reduce the formation of thermally unstable grains (e.g., having a thickness less than 3 nm), achieve reduced media surface roughness, and maintain desirable magnetic properties of the magnetic medium.

Figure 6:
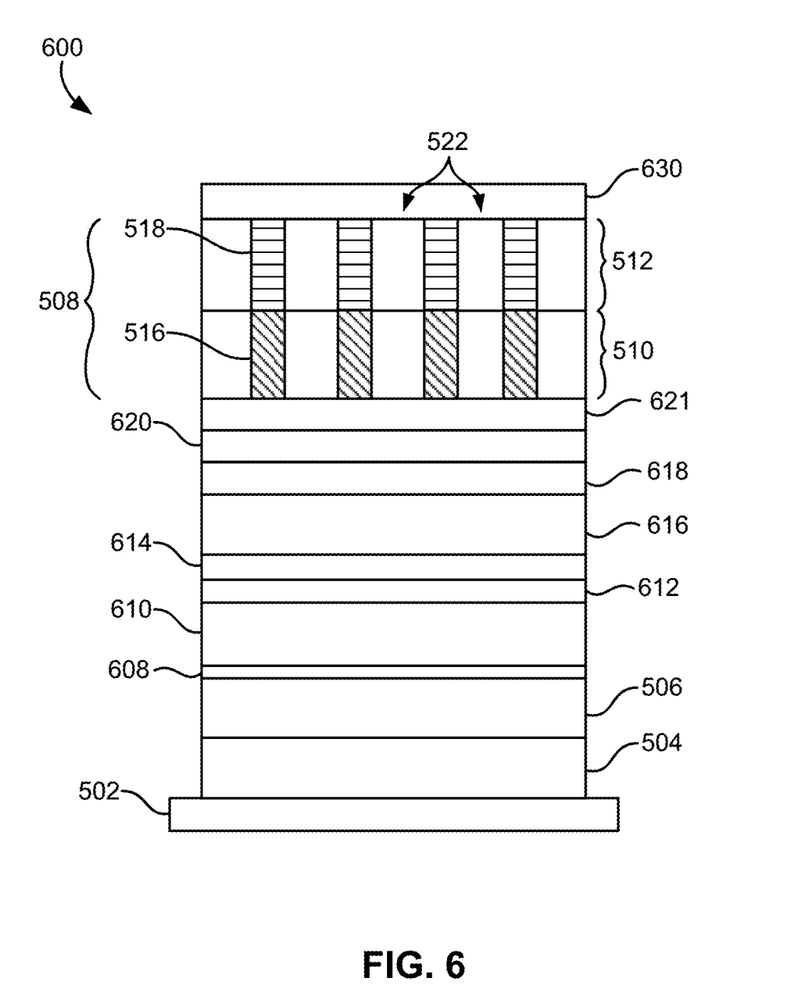
FIG. 6 is a partial cross-sectional view of a magnetic medium according to one embodiment.

FIG. 6 depicts a magnetic medium 600 according to an exemplary embodiment, which is in no way intended to limit the invention. As an option, the present magnetic medium 600 may be implemented in conjunction with features from any other embodiment listed herein, such as those described with reference to the other FIGS. Of course, however, such magnetic medium 600 and others presented herein may be used in various applications and/or in permutations which may or may not be specifically described in the illustrative embodiments listed herein.

It should be noted that the magnetic medium 600 illustrates a variation of the embodiment of FIG. 5A, depicting a detailed layered structure of the magnetic medium 600. Accordingly, various components of FIG. 6 have common numbering with those of FIG. 5A. Further, the magnetic medium 600 presented herein may be used in any desired environment.

The magnetic medium 600 includes a seed layer 504 above a substrate layer 502. Above seed layer 504 there may be soft under layers 506, 610, which are illustrated as being separated by a thin spacer layer 608, e.g., of Ru or other nonmagnetic material. According to different approaches, the seed layer 504 may have a preferred thickness of about 33 nm and the soft under layers 506, 610 may have a preferred thickness of about 15 nm, but the respective thickness of either layer may be higher or lower depending on the desired embodiment.

The magnetic medium 600 further includes a pair of layers 612, 616, which are separated by an MgO layer 614. One or both of the layers 612, 616 preferably act as heat sinks, thereby dissipating heat generated when performing HAMR operations as described above. Illustrative materials for one or both layers 612, 616 include Cr, Cu, Au, Ag, W, Mo, etc. and alloys thereof such as CuX, AuX, AgX etc.

Above Cr layer 616, another MgO layer 618, MgO—$SiO_2$ layer 620 and FePt layer 621 are included. In preferred approaches, one or more of the aforementioned layers 618, 620, 621 may act as a texture defining layer, e.g., which influences the epitaxial growth of the magnetic layers formed there above. According to different embodiments, other materials may be used to form a texture defining layer as would be appreciate by one skilled in the art upon reading the present description.

Furthermore, the magnetic medium 600 includes a recording layer 508 and a cap layer 630, above the texture defining layers 618, 620, 621. Depending on the desired embodiment, the cap layer 630 may include any conventional magnetic cap layer, e.g., FePt. In one approach, the cap 630 may act as a protective coating for the magnetic layers 510, 512 therebelow. In another approach, the cap 630 may be a continuous exchange layer, but is not limited thereto. Moreover, a carbonaceous overcoat layer (not shown) may be formed above the cap layer 630.

Looking to the recording layer 508, as described above, the recording layer 508 may include a first magnetic layer 510 having a first segregant 516, and a second magnetic layer 512 having a second segregant 518. Composite magnetic grains 522 are defined by grain boundaries interfacing with the segregants. Moreover, according to various embodiments, any of the magnetic layers 510, 512 may include any of the materials, dimensions, etc., as described herein. It should also be noted that although only two magnetic layers are illustrated in FIG. 6, according to various other embodiments, a magnetic medium may include additional magnetic layers, e.g., in the recording layer thereof.

It should also be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic medium, comprising:
a recording layer having first and second magnetic layers,
the first magnetic layer having a first segregant between magnetic grains thereof, the first segregant being primarily C,
the second magnetic layer being formed above the first magnetic layer, the second magnetic layer having a second segregant between magnetic grains thereof, the second segregant being primarily C and a second component,
wherein an average pitch of the magnetic grains in the first magnetic layer and the second magnetic layer is in a range from about 2 nm to about 11 nm.

2. The magnetic medium as recited in claim 1, wherein the second component is selected from a group consisting of: $SiO_2$, $TiO_2$, $TaO_x$, SiC, SiN, TiC, TiN, BN, BC, $Cr_2O_3$, CrN.

3. The magnetic medium as recited in claim 2, wherein the second component is BN.

4. The magnetic medium as recited in claim 2, wherein the recording layer has a third magnetic layer having a third segregant between magnetic grains thereof, the third segregant comprising C and a third component, the third component of the third segregant being different than the second component of the second segregant.

5. The magnetic medium as recited in claim 4, wherein a C content in the third segregant is less than a C content in the second segregant.

6. The magnetic medium as recited in claim, wherein a C content in the second segregant is in a range of about 50 to about 80 vol %, wherein a content of the second component in the second segregant is in a range of about 20 to about 50 vol %.

7. The magnetic medium as recited in claim 6, wherein the second component is selected from a group consisting of: $SiO_2$, $TiO_2$, $TaO_x$, SiC, SiN, TiC, TiN, BN, BC, $Cr_2O_3$, CrN.

8. The magnetic medium as recited in claim 1, wherein the magnetic grains of the second magnetic layer are physically characterized by growth directly on the magnetic grains of the first magnetic layer.

9. The magnetic medium as recited in claim 1, wherein the magnetic grains of the first and second magnetic layers form composite magnetic grains extending through the recording layer, wherein a total thickness of the composite magnetic grains is at least 6 nm, and wherein the composite magnetic grains have an average aspect ratio of at least 1.2.

10. The magnetic medium as recited in claim 1, wherein the first and second magnetic layers each comprise FePt.

11. The magnetic medium as recited in claim 1, wherein the magnetic grains of at least one of the first and second magnetic layers each comprise FePt—X, where is X is selected from a group consisting of Ag, Cu, Au, Ni, and Mn.

12. A magnetic data storage system, comprising:
at least one magnetic head;
a magnetic medium as recited in claim 1;
a drive mechanism for passing the magnetic medium over the at least ne magnetic head; and
a controller electrically coupled to the at least one magnetic head for controlling operation of the at least one magnetic head.

13. The magnetic medium as recited in claim 1, comprising a first underlayer formed below and on the first magnetic layer, wherein the first underlayer comprises FePt.

14. The magnetic medium as recited in claim 13, comprising: a second underlayer formed below and on the first underlayer, the second underlayer comprising MgO and $SiO_2$; and a third underlayer formed below and on the second underlayer, the third underlayer comprising MgO.

15. A magnetic medium, comprising:
a recording layer having first and second magnetic layers each comprising FePt,
the first magnetic layer having a first segregant between magnetic grains thereof,
the second magnetic layer being formed above the first magnetic layer, the second magnetic layer having a second segregant between magnetic grains thereof, the second segregant being different than the first segregant,
wherein an average pitch of the magnetic grains in the first magnetic layer and the second magnetic layer is in a range from 2 nm to 11 nm.

16. The magnetic medium as recited in claim 15, wherein the first magnetic layer includes about 20 to about 50 vol % of C, the C being almost entirely in the first segregant of the first magnetic layer.

17. The magnetic medium as recited in claim 15, wherein a C content in the second segregant is in a range of about 50 to about 80 vol %, and wherein a content of a second component in the second segregant is in a range of about 20 to about 50 vol %.

18. The magnetic medium as recited in claim 17, wherein the second component is selected from a group consisting of: $SiO_2$, $TiO_2$, $TaO_x$, SiC, SiN, TiC, TiN, BN, BC, $Cr_2O_3$, CrN.

19. The magnetic medium as recited in claim 17, wherein the second component is BN.

20. The magnetic medium as recited in claim 15, wherein magnetic grains of the second magnetic layer are physically characterized by growth directly on magnetic grains of the first magnetic layer.

21. The magnetic medium as recited in claim 15, wherein the magnetic grains of the first and second magnetic layers form composite magnetic grains extending through the recording layer, wherein a total thickness of the composite magnetic grains is at least 6 nm.

22. A magnetic data storage system, comprising:
at least one magnetic head;
a magnetic medium as recited in claim 15;
a drive mechanism for passing the magnetic medium over the at least one magnetic head; and
a controller electrically coupled to the at least one magnetic head for controlling operation of the at least one magnetic head.

23. The magnetic medium as recited in claim 15, wherein the magnetic grains of the first and second magnetic layers each comprise FePt—X, where is X is Ni and/or Mn.

\* \* \* \* \*